(12) United States Patent
Morikawa

(10) Patent No.: US 12,149,669 B2
(45) Date of Patent: Nov. 19, 2024

(54) PRINTING DEVICE INCLUDING CONTROLLER CONTROLLING EACH OF A PLURALITY OF MEASURING MEMBERS TO MEASURE COLOR OF EACH PATCH

(71) Applicant: BROTHER KOGYO KABUSHIKI KAISHA, Nagoya (JP)

(72) Inventor: Shota Morikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/353,970

(22) Filed: Jul. 18, 2023

(65) Prior Publication Data

US 2024/0040062 A1    Feb. 1, 2024

(30) Foreign Application Priority Data

Jul. 29, 2022  (JP) .................................. 2022-121575

(51) Int. Cl.
*H04N 1/60* (2006.01)

(52) U.S. Cl.
CPC ......... *H04N 1/6033* (2013.01); *H04N 1/6019* (2013.01)

(58) Field of Classification Search
CPC ............................ H04N 1/6033; H04N 1/6019
See application file for complete search history.

(56) References Cited

U.S. PATENT DOCUMENTS

| | | | | |
|---|---|---|---|---|
| 7,088,479 B2 * | 8/2006 | Fujita | ................... | H04N 1/6027 |
| | | | | 358/518 |
| 2006/0092442 A1 * | 5/2006 | Such | ...................... | B44D 3/003 |
| | | | | 358/1.9 |
| 2015/0350493 A1 * | 12/2015 | Sakatani | .............. | H04N 1/6052 |
| | | | | 358/504 |
| 2016/0261773 A1 * | 9/2016 | Tsuji | .................. | H04N 1/00023 |
| 2023/0171366 A1 * | 6/2023 | Morikawa | ............ | H04N 1/6033 |
| | | | | 358/1.9 |

FOREIGN PATENT DOCUMENTS

| | | |
|---|---|---|
| JP | 2008-200894 A | 9/2008 |
| JP | 2010-157920 A | 7/2010 |

OTHER PUBLICATIONS

Marazzi et al., The truncated mean of an asymmetric distribution, Computational Statistics & Data Analysis 32 (1999) 79-100 (Year: 1999).*

* cited by examiner

*Primary Examiner* — Barbara D Reinier
(74) *Attorney, Agent, or Firm* — Scully, Scott, Murphy & Presser, PC

(57) ABSTRACT

The printing device includes a print head, a plurality of measuring members, and a controller. The print head is configured to print a patch chart on a print medium. The patch chart includes a plurality of patches including a plurality of first patches and one or more second patches. Each first patch has a predetermined color. Each second patch has a user specified color represented by an input color value. Each of the plurality of measuring members is configured to measure a color of a patch. The controller is configured to perform: a second-patch measurement process to control each of the plurality of measuring members to measure a color of each second patch to acquire a plurality of color values for the each second patch.

13 Claims, 12 Drawing Sheets

| No. | SECOND PATCH | THE NUMBER OF PATCHES |
|---|---|---|
| 1 | ABSENT | 36 |
| 2 | ABSENT | 36 |
| ... | ... | ... |
| ... | ... | ... |
| 23 | PRESENT | 36 |
| ... | ... | ... |

| No. | TYPE | POSITION | COLOR VALUE | | | MEASURED COLOR VALUE | | |
|---|---|---|---|---|---|---|---|---|
| | | | R | G | B | L | a | b |
| 1 | FIRST PATCH | 1ST COLUMN 1ST ROW | 0 | 0 | 0 | | | |
| 2 | FIRST PATCH | 1ST COLUMN 2ND ROW | 7 | 0 | 0 | | | |
| ... | ... | ... | ... | ... | ... | ... | ... | ... |
| 730 | SECOND PATCH | 22-TH COLUMN 1ST ROW | 255 | 160 | 32 | | | |
| 731 | SECOND PATCH | 22-TH COLUMN 2ND ROW | 255 | 176 | 80 | | | |
| ... | ... | ... | ... | ... | ... | ... | ... | ... |

PRINTING DEVICE INCLUDING CONTROLLER CONTROLLING EACH OF A PLURALITY OF MEASURING MEMBERS TO MEASURE COLOR OF EACH PATCH

REFERENCE TO RELATED APPLICATIONS

This application claims priority from Japanese Patent Application No. 2022-121575 filed on Jul. 29, 2022. The entire content of the priority application is incorporated herein by reference.

BACKGROUND ART

An information processing device known in the art is one example of a conventional colorimetry system for measuring colors in printed matter. The conventional information processing device extracts all colors represented by target data to be printed and acquires the occupancy ratio of each color in the printing area. The information processing device then generates data for calibration patch images based on these occupancy ratios and controls a printer to print the calibration patch images. Next, the information processing device uses a colorimeter to measure the colors of the printed calibration patch images and calibrates the image data for the target image on the basis of this colorimetric data.

DESCRIPTION

The conventional information processing device described above measures printed calibration patches with a colorimeter all in the same manner and calibrates the image data to be printed on the basis of this colorimetric data. However, using the same method to measure colors of all calibration patch images with the colorimeter may decrease the accuracy of color measurements, resulting in reduced accuracy of color calibration.

In view of the foregoing, it is an object of the present disclosure to provide a printing device, a color measurement method, and a color measurement program capable of improving the accuracy of color calibration.

In order to attain the above and other object, the present disclosure provides a printing device. The printing device includes a print head, a plurality of measuring members, and a controller. The print head is configured to print a patch chart on a print medium. The patch chart includes a plurality of patches including a plurality of first patches and one or more second patches. Each first patch has a predetermined color. Each second patch has a user specified color represented by an input color value. Each of the plurality of measuring members is configured to measure a color of a patch. The controller is configured to perform: a second-patch measurement process to control each of the plurality of measuring members to measure a color of each second patch to acquire a plurality of color values for the each second patch.

According to another aspect, the disclosure provides a printing device. The printing device includes a print head, a plurality of measuring members, and a controller. The print head is configured to print a patch chart on a print medium. The patch chart includes a plurality of patches including a plurality of first patches and a plurality of second patches. Each first patch has a predetermined color. Each second patch has a user specified color represented by an input color value. Each of the plurality of measuring members is configured to measure a color of a patch. The plurality of second patches includes two or more second patches represented by a same input color value. The controller is configured to perform: a printing process to control the print head to print the patch chart; a second-patch measurement process to control the plurality of measuring members to measure colors of the two or more second patches based on the same input color value to acquire two or more color values; and calculating an average value of at least two of the two or more color values, as a measured color value corresponding to the same input color value.

According to another aspect, the disclosure provides A method for measuring colors of a patch chart on a print medium. The patch chart includes a plurality of patches including a plurality of first patches and one or more second patches. Each first patch has a predetermined color. Each second patch has a user specified color represented by an input color value. The method includes controlling each of a plurality of measuring members to measure a color of each second patch to acquire a plurality of color values for the each second patch.

According to another aspect, the disclosure provides a method for measuring colors of a patch chart. The method includes: controlling a print head to print the patch chart on a print medium, the patch chart including a plurality of patches including a plurality of first patches and a plurality of second patches, each first patch having a predetermined color, each second patch having a user specified color represented by an input color value, the plurality of second patches including two or more second patches represented by a same input color value; controlling a plurality of measuring members to measure colors of the two or more second patches based on the same input color value to acquire two or more color values; and calculating an average value of at least two of the two or more color values, as a measured color value corresponding to the same input color value.

In the above structure, the accuracy of color measurements can be improved.

FIG. 5 is an example of a patch column table storing patch column information.

FIG. 6 is an example of a table correlating input color values of patches with measured color values.

The embodiments of the present disclosure will be described while referring to the accompanied drawings. The following embodiments are just examples and the present invention is not limited to these embodiments. The embodiments can be modified without departing from the scope of the invention. For example, some components and/or steps can be added, and/or deleted.

FIRST EMBODIMENT

Figure 1:
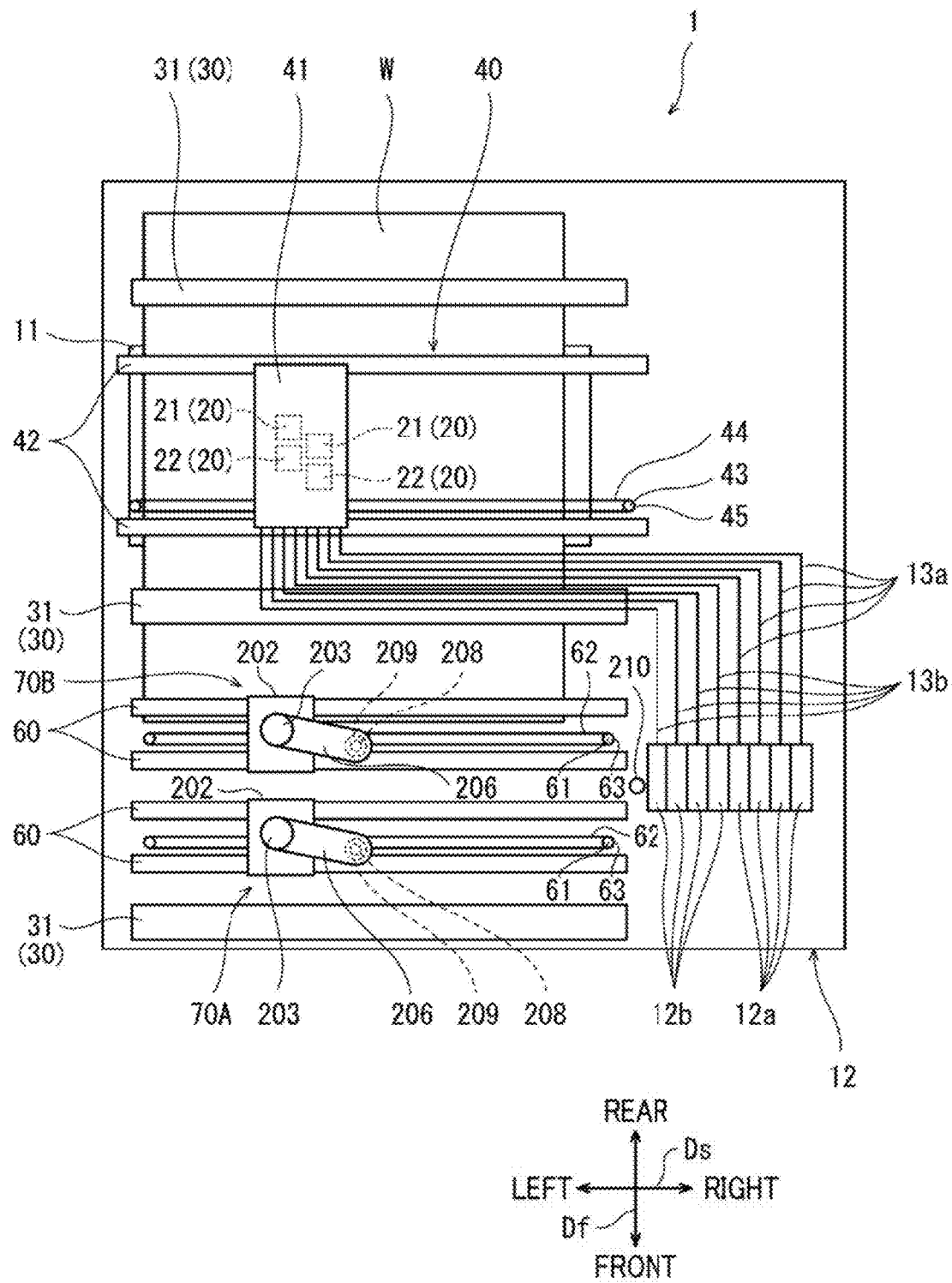
FIG. 1 is a plan view of a printing device.

FIG. 1 is a plan view showing a printing device 1 according to a first embodiment of the present disclosure. In FIG. 1, a first direction Ds, a second direction Df, and a third direction are each orthogonal to the others. In this embodiment, the first direction Ds is the moving direction of a carriage 41 described later, the second direction Df is the conveying direction of a print medium W described later, and the third direction is the up-down direction, for example. Thus, in the following description, Ds will be called the moving direction, Df will be called the conveying direction, and the third direction will be called the up-down direction.

As shown in FIG. 1, the printing device 1 is a serial inkjet printer. The printing device 1 is provided with a plurality of ejection heads 20 (see FIG. 2), a platen 11, a plurality of tanks 12, a conveying device 30, and a scanning device 40. However, the printing device 1 may also be configured as a line head printer. In this case, the scanning device 40 is omitted from the printing device 1, and the ejection heads 20 are immobile and have a length in the moving direction Ds greater than the printing area on the print medium W.

The ejection heads 20 use ink in primary colors (described later) to print images on print media W based on image data. The image data includes color values (input color values). In this example, each input color value indicates a color and includes component values represented by RGB values in the RGB color space, i.e., as color coordinates in a device-dependent color space. The RGB values express a single color through a combination of a red color value, a green color value, and a blue color value, each of which represents one of a possible 256 gradations (0-255).

The ejection heads 20 print a patch chart PT described later (see FIG. 4) on the print media W. In the present embodiment, the ejection heads 20 correspond to the print engine (or printing unit). The ejection heads 20 include two first ejection heads 21, and two second ejection heads 22, for example. The platen 11 has a flat top surface and defines the distance between a print medium W placed on this top surface and the bottom surface of the ejection heads 20 disposed in opposition to this top surface. The tanks 12 are containers for storing ink. The number of tanks 12 is equal to or greater than the number of ink types. For example, the tanks 12 include four first tanks 12a that store ink in respective ones of the four primary colors, and one or a plurality of second tanks 12b that store ink in special colors.

Examples of primary color inks are cyan ink, yellow ink, magenta ink, and black ink. Special color inks have different colors from the primary colors. Examples of special color inks are red ink, green ink, and blue ink.

The first tanks 12a store ink in the primary colors and communicate with the first ejection heads 21 through first channels 13a. Ink in the primary colors is supplied from the first tanks 12a to the first ejection heads 21 via the first channels 13a. The second tanks 12b communicate with the second ejection heads 22 via second channels 13b. When the second tanks 12b store ink in special colors, the special color inks flow from the second tanks 12b into the second channels 13b, filling the second channels 13b. From the second channels 13b, the special color inks are supplied to the ejection heads 20. Before ink in special colors is stored in the second tanks 12b, the second tanks 12b are filled with a storage solution. The first channels 13a and the second channels 13b are rubber or plastic tubes, for example, which are preferably resistant to kinking.

The conveying device 30 has three sets of conveying rollers 31, and a conveying motor 32 (see FIG. 2), for example. One set of the three sets of conveying rollers is located downstream of two pairs of guide rails 60 (described later) in the conveying direction DF. The conveying rollers 31 have axes aligned in the moving direction Ds. In each set, the conveying rollers 31 are aligned in the up-down direction Dz and are configured to nip a print medium W therebetween. One conveying roller 31 in each set is connected to the conveying motor 32. The conveying rollers 31 rotate about their axes when driven by the conveying motor 32 and convey a print medium W over the platen 11 in the conveying direction Df.

The scanning device 40 has a carriage 41, the pair of guide rails 42, a scanning motor 43, and an endless belt 44. The guide rails 42 extend in the moving direction Ds over the platen 11 so that the ejection heads 20 are interposed between the guide rails 42 in the conveying direction Df. The carriage 41 is supported on the guide rails 42 to be movable in the moving direction Ds. The carriage 41 supports the ejection heads 20. The endless belt 44 extends in the moving direction Ds and is attached to the carriage 41. The endless belt 44 is also attached to the scanning motor 43 via a pulley 45. When the scanning motor 43 is driven, the endless belt 44 circulates and the carriage 41 reciprocates in the moving direction Ds along the guide rails 42. In this way, the carriage 41 moves the ejection heads 20 in the moving direction Ds.

The printing device 1 further includes two pairs of guide rails 60. The printing device 1 further includes two scanning devices 65, two endless belts, two pullies 63, and colorimetric devices 70A and 70B. Each pair of guide rails 60 corresponds to one of the two scanning devices 65, one of the two endless belts, one of the two pullies 63, and one of the colorimetric devices 70A and 70B. Each scanning device 65 has a scanning motor 61 (see FIG. 2). The colorimetric device 70A is disposed on the downstream side of the colorimetric device in the conveying direction Df.

Figure 2:
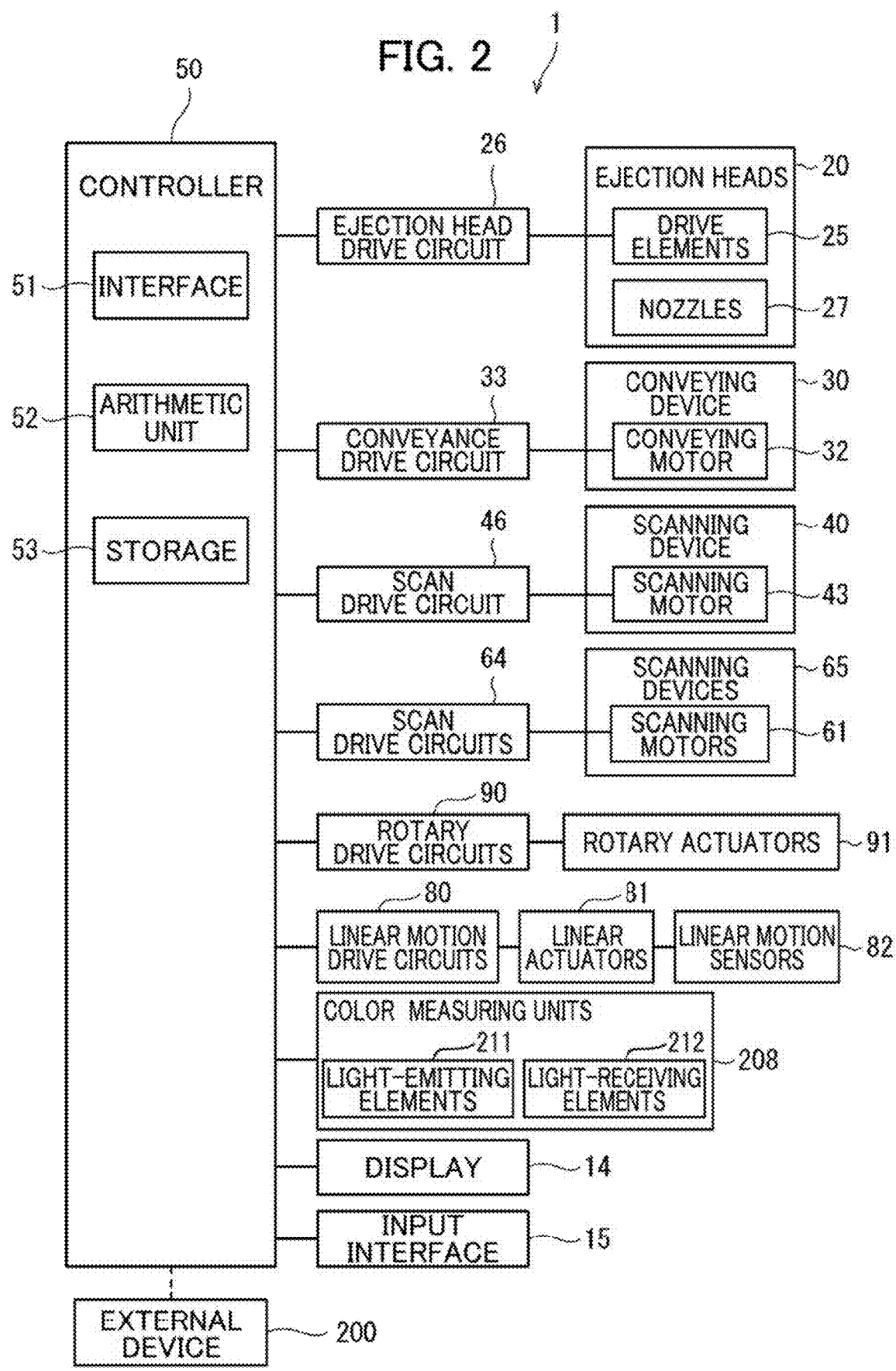
FIG. 2 is a block diagram showing a configuration of a control system of the printing device shown in FIG. 1.

Each of the colorimetric devices 70A and 70B has a base 202, a rotary joint 203, an arm 206, a color measuring unit 208, a prismatic joint 209, and a rotary actuator 91 including a motor or the like (see FIG. 2). The printing device 1 also has a white reference 210 that is shared by both color measuring units 208 for calibrating the accuracy of the color measuring units 208 in measuring color values.

The pair of guide rails 60 corresponding to the colorimetric device 70B is arranged downstream of the carriage 41 in the conveying direction Df The pair of guide rails 60 corresponding to the colorimetric device 70A is arranged downstream of the pair of guide rails corresponding to the colorimetric device 70B in the conveying direction Df The guide rails extend in the moving direction Ds. Each endless belt 62 extending in the moving direction Ds is attached to a corresponding one of the bases 202 of the colorimetric devices 70A and 70B. Each endless belt 62 is also attached to the corresponding scanning motor 61 via the corresponding pulley 63. When the scanning motor 61 is driven, the corresponding endless belt 62 circulates, and the corresponding base 202 reciprocates in the moving direction Ds along the corresponding guide rails 60. In this way, the base 202 moves the corresponding color measuring unit 208 in the moving direction Ds.

The white reference 210 is used in a process for adjusting the accuracy with which the color measuring units 208 measure color values (hereinafter also called "calibration process" or "calibration"). The white reference 210 is disposed in an area that both color measuring g units 208 can measure. For example, the white reference 210 is located within the range in the moving direction Ds and conveying direction Df that each arm 206 can move the corresponding color measuring unit 208 so that the color measuring unit 208 can face the white reference 210 in the up-down direction. In the example of FIG. 1, the white reference 210 is disposed between the guide rails 60 for the colorimetric device 70B and the guide rails 60 for the colorimetric device 70A in the conveying direction Df and on one side (the right side) of one end (the right end) of each of the guide rails 60. The white reference 210 has a predetermined color (white color) such that the color measuring unit 208 outputs a predetermined color value when the color measuring unit 208 measures a color of the white reference 210 under a specific measuring condition. Here, the predetermined color value has component values expressed by color coordinates in a device-independent color space, such as L*a*b* values. During a calibration process, the color measuring units 208 are controlled to measure the color of the white reference 210 to acquire its measured color value (colorimetric value) having components values represented in the L*a*b* color space. The predetermined color value of the white reference 210 is then acquired from the storage 53 (see FIG. 2) and, together with the measured color value and color measuring conditions, are used to calibrate the measuring accuracy of the color measuring units 208.

The proximal end of each arm 206 is connected to the corresponding base 202 by the corresponding rotary joint 203, for example. Each rotary joint 203 has an actuator, such as a motor, which rotates the corresponding arm 206 relative to the corresponding base 202 about a central axis aligned in the up-down direction. Additionally, the distal end of each arm 206 is connected to the corresponding color measuring unit 208 via the corresponding prismatic joint 209, for example. Each prismatic joint 209 has a linear actuator, such as a motor or solenoid, which moves the corresponding color measuring unit 208 up and down relative to the corresponding arm 206. With this configuration, the arms 206 can move the corresponding color measuring units 208 three-dimensionally.

Each color measuring unit 208 is a spectrophotometer and colorimeter, for example, and has a light-emitting element 211 and a light-receiving element 211. The light-emitting element 211 is a light source, such as an illuminant D65, C, or A, and irradiates light onto patches P (see FIG. 4) formed on a print medium W. The light-receiving element 212 receives light irradiated from the corresponding light-emitting element 211 and reflected off the patches P. The color measuring unit 208 measures the colors of patches P on the basis of light received by the light-receiving element 212 therein to acquire measured color values (colorimetric values). Each colorimetric value is expressed as a color value having component values, that is, color coordinates in a device-independent color space such as Lab values in the L*a*b* color space or XYZ values in the XYZ color space.

FIG. 2 is a block diagram showing the configuration of the control system in the printing device 1 shown in FIG. 1. As shown in FIG. 2, the ejection heads 20 have a plurality of drive elements 25. The drive elements 25 may be piezoelectric elements, heating elements, electrostatic actuators, and the like. The drive elements 25 are provided for respective nozzles 27 formed in the ejection heads 20 and apply pressure to the ink to eject ink droplets from the corresponding nozzles 27.

The printing device 1 is further provided with a display 14, an input interface 15, and a controller 50. The controller 50 has an interface 51, an arithmetic unit 52, and a storage 53. The interface 51 receives image data and other various data from an external device 200. The external device 200 may be a computer, a camera, a communication network, a storage medium, a display, a printer, or the like. The image data is raster data and the like representing an image to be printed on print media W. The image data includes information on printing conditions such as the type of print medium W and the like. The controller 50 may be configured as a standalone device, or a plurality of devices in a distributed arrangement. In the latter case, the devices interact with each other to operate the printing device 1.

Figure 4:
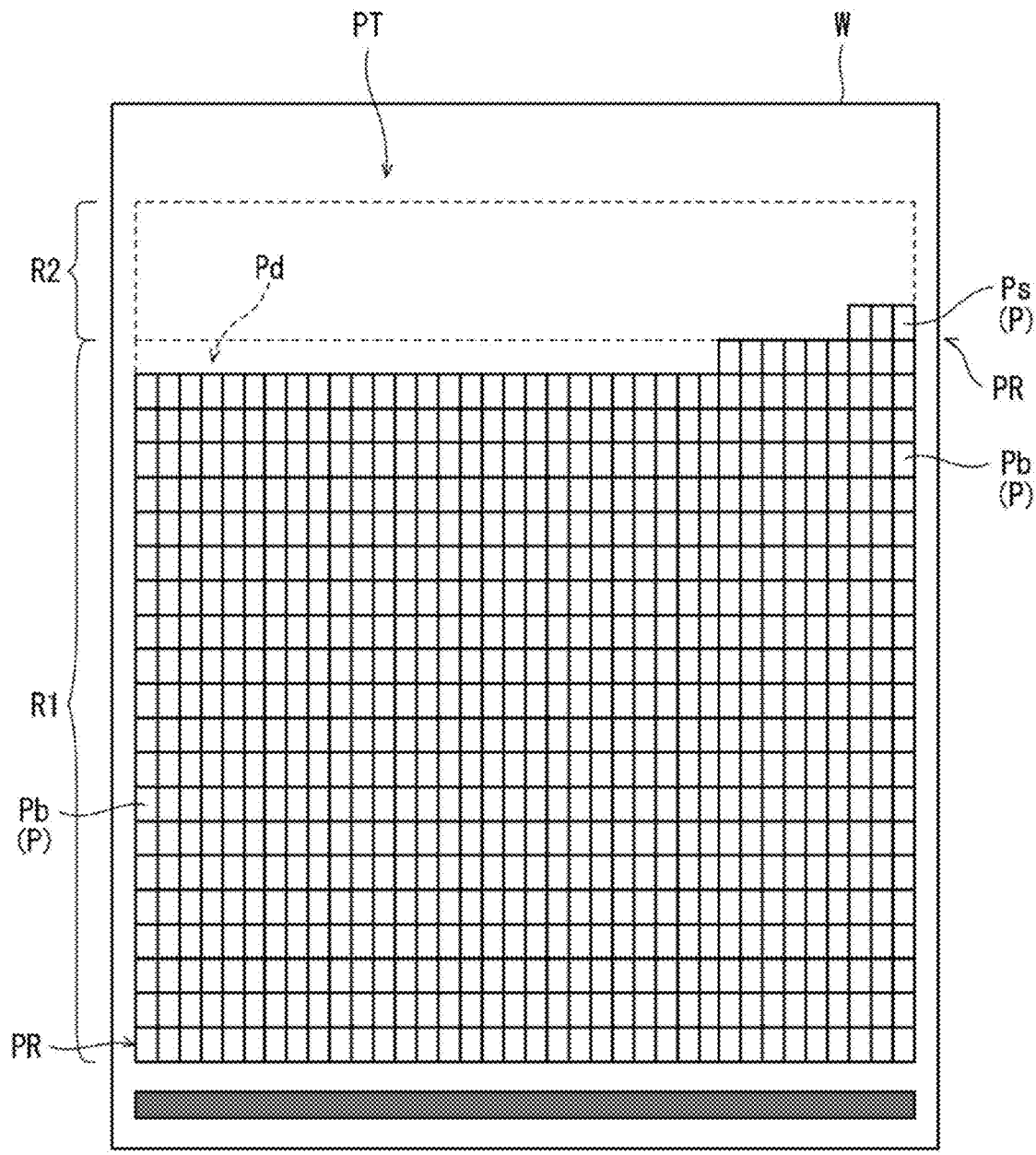
FIG. 4 is an explanatory diagram showing an example of a patch chart printed on a print medium.
Figure 4:
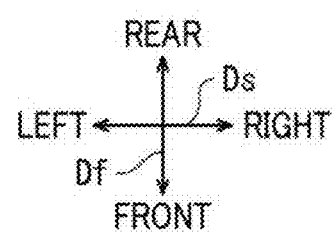

The storage 53 stores patch chart data representing a patch chart PT (see FIG. 4). The storage 53 is memory that the arithmetic unit 52 can access. The storage 53 has RAM and ROM. The RAM temporarily stores various data, including data received from the external device 200, such as image data, and data converted by the arithmetic unit 52. The ROM stores a printing program, a color measurement program, prescribed data, and the like for performing various data processes. As an alternative to the storage 53, the printing program and color measurement program may be stored in an external storage medium such as a CD-ROM that is accessible by the arithmetic unit 52.

The arithmetic unit 52 includes a CPU or other processor and at least one circuit, such as an ASIC or other integrated circuit. By performing the printing program and color measurement program, the arithmetic unit 52 controls the components of the printing device 1 to implement a printing operation and other various operations. The arithmetic unit 52 is an example of a computer and a device for measuring colors.

The display 14 is a display, for example. In accordance with instructions from the controller 50, the display 14 displays images represented by image data, and the like. The input interface 15 includes buttons and the like, for example, that the user operates. Alternatively, the input interface 15 may be a touchscreen integrated with the display 14.

The controller 50 is electrically connected to the conveying motor 32 of the conveying device 30 via a conveyance drive circuit 33 for controlling the drive of the conveying motor 32. Accordingly, the controller 50 controls conveyance of the print medium W by the conveying rollers 31 of the conveying device 30. The controller 50 is also electrically connected to the scanning motor 43 of the scanning device 40 via a scan drive circuit 46 for controlling the drive of the scanning motor 43. Accordingly, the controller 50 controls movement of the ejection heads 20 by the carriage 41 of the scanning device 40. The controller 50 is further electrically connected to the drive elements 25 via an ejection head drive circuit 26. The controller 50 outputs control signals for the drive elements 25 to the ejection head drive circuit 26, and the ejection head drive circuit 26 generates and outputs drive signals to the drive elements 25 on the basis of these control signals. When driven according to the drive signals, the drive elements 25 eject ink droplets from corresponding nozzles 27.

The controller 50 is electrically connected to the scanning motors 61 via two scan drive circuits 64 for controlling the drive of the corresponding scanning motors 61. Accordingly, the controller 50 controls movements of the color measuring units 208 in the moving direction Ds by the bases 202. The controller 50 is also connected to two rotary actuators 91 configured of motors and the like, for example, via corresponding two rotary drive circuits 90. Accordingly, the controller 50 controls rotary motion of the arms 206 by the rotary joints 203 described above.

In order to move the color measuring units 208 in the up-down direction, each of the colorimetric devices 70A and 70B is further provided with a linear motion drive circuit 80, a linear actuator 81, and a linear motion sensor 82. The linear actuator 81 and the linear motion sensor 82 are provided on the prismatic joint 209 described above. The linear actuator 81 includes a motor, for example, for moving the corresponding color measuring unit 208 up and down in order to place the color measuring unit 208 into contact with and to separate the color measuring unit 208 from the print medium W. The controller 50 is connected to the linear actuators 81 via the corresponding linear motion drive circuits 80, and to the linear motion sensors 82. Each linear motion sensor 82 is an encoder, for example, that detects the amount of movement of the corresponding linear actuator 81. The controller 50 controls the operations of each linear actuator 81 on the basis of detection results from the corresponding linear motion sensor 82, thereby controlling vertical movement of the corresponding color measuring unit 208 on the basis of the detection results of the linear motion sensor 82.

Thus, as means for moving the print medium W and the color measuring units 208 relative to each other, the printing device 1 has the conveying device 30 that conveys the print medium W in the conveying direction Df, the bases 202 that move the color measuring units 208 in the moving direction Ds, the rotary actuators 91 that move the color measuring units 208 in the moving direction Ds and the conveying direction Df, and the linear actuators 81 that move the color measuring units 208 in the up-down direction.

With the printing device 1 having the above configuration, the controller 50 acquires image data and performs a printing operation based on this image data. In the printing operation, the controller 50 ejects ink onto the print medium W from the ejection heads 20 while moving the ejection heads 20 in the moving direction Ds for each printing pass. Next, the controller 50 conveys the print medium W forward in the conveying direction Df The printing device 1 repeatedly alternates between a printing pass and a conveying operation in this way to print an image on the print medium W based on the image data. For example, the image data may be image data representing an image that the user wishes to print, and image data for the patch chart PT (hereinafter, referred to as the patch chart image data).

Figure 3:
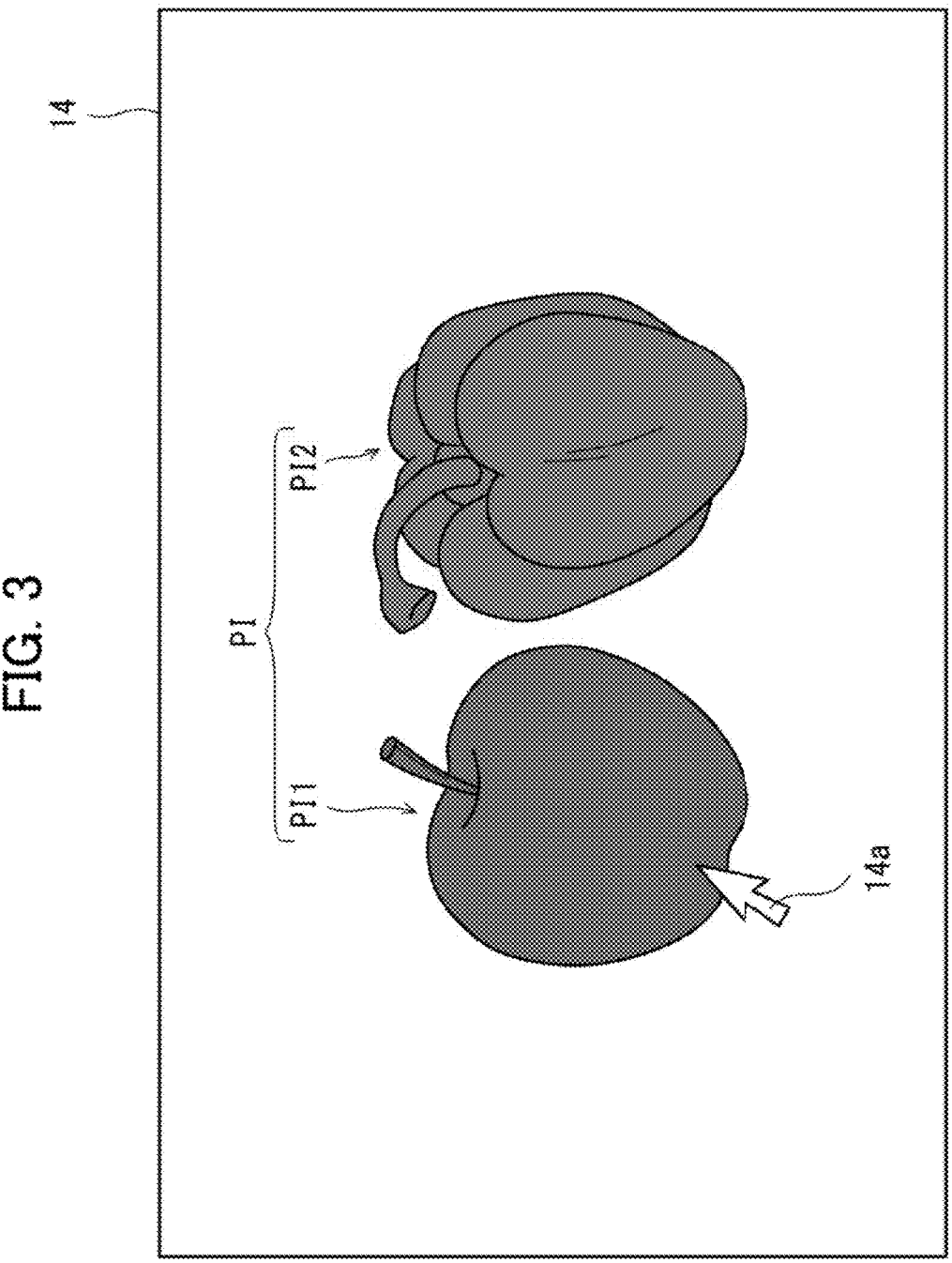
FIG. 3 is an explanatory diagram showing a sample preview image displayed on a display and an image designated by a user within the preview image.

FIG. 3 shows a sample preview image PI displayed on the display 14 based on image data that the user wishes to print. The display in FIG. 3 also shows an example of an image designated by a user within the preview image PI.

The controller 50 displays the preview image PI on the display 14 based on image data stored in the storage 53. The preview image PI in the example of FIG. 3 includes an apple preview image PI1 and a bell pepper preview image PI2. When the preview image PI is displayed on the display 14, the user specifies an image (pixel) having the color for which the user wishes to create a patch P (a second patch Ps described later). In the example of FIG. 3, the user has moved a pointer 14a over the display 14 to indicate a pixel in the apple preview image PI1 (desired color in the apple preview image PI1). Information related to the user-specified image is transmitted from the display 14 to the controller 50.

FIG. 4 shows an example of the patch chart PT printed on a print medium W by the printing device 1. A direction Dm indicated in FIG. 4 from the upstream side (left side) toward the downstream side (right side) in the moving direction Ds denotes a color measuring direction Dm indicating the order in which patch colors are measured.

As shown in FIG. 4, the patch chart PT has a plurality of patches P arranged in the front-rear direction and the left-right direction to form a grid pattern. Thus, the any patch P in the patch chart PT can be defined by its column and row. In this case, the left-right position of a patch P in the patch chart PT is defined by its row and the front-rear position of the patch P is defined by its column. The patch chart PT includes a first patch area R1 in which first patches Pb are arranged, and a second patch area R2 in which second patches Ps are arranged. The second patch area R2 is different from the first patch area R1 and constitutes a margin area adjacent to the first patch area R1 in the conveying direction Df. The second patch area R2 is located upstream side of the first patch area R1 in the conveying direction Df Each of the first patch area R1 and second patch area R2 is formed in a rectangular shape in a plan view, for example. The patch chart PT includes a plurality of patch columns PR, with each patch column PR having a plurality of patches P aligned linearly in the moving direction Ds. Patch columns PR in the first patch area R1 are formed of first patches Pb, while patch columns PR in the second patch area R2 are formed of second patches Ps. In other words, the plurality of patch columns is arranged in parallel in the conveying direction Df, and patches is arranged linearly in the moving direction Ds in each patch column.

The first patches Pb in the first patch area R1 and the second patches Ps in the second patch area R2 are arranged sequentially beginning from the patch on the downstream side in the conveying direction Df and on one sider (the right side) in the moving direction Ds. This arrangement is implemented for each patch column PR toward the upstream side in the conveying direction Df.

The first patches Pb are patches P corresponding to the basic colors in the image data and are arranged at predetermined positions in the patch chart PT. The basic colors are predetermined colors always included in the first patch area R1 of the patch chart PT. The second patches Ps, on the other hand, have colors that the user has specified in the preview image PI described above. Each second patch Ps is a patch P having a color specified by the user in the preview image PI shown in FIG. 3. The second patches Ps are arranged in the second patch area R2 of the patch chart PT. To form second patches Ps, the controller 50 generates raster data that includes the ink color, droplet size, and droplet ejection order (arrangement) for forming patches P corresponding to second patches Ps. The first patches Pb may be referred to as basic patches, while the second patches Ps may be called key patches.

The patch chart PT includes a plurality of marker images arranged at positions surrounding the first patch area R1 and the second patch area R2. For example, the marker images are located at corners of the first patch area R1 and the corners of the second path area R2 and designates patches or regions at the corners. By specifying positions of the plurality of printed marker images on the print medium W using the colorimetric devices 70 A and 70B, the controller 50 can determine the first patch area R1 and the second patch area R2 on the print medium W. The marker image has a prescribed shape and color so that the controller 50 can recognize the marker image from the measurement results by the colorimetric devices 70 A and For example, the marker image may be a bold black frame surrounding a patch or a region having the same shape of the patch to designate the patch or region, or a black arrow designating a patch or a region in the patch chart PT.

A process to acquire position information on each patch column PR is performed prior to measuring the colors of patches P. In this process, the controller 50 controls the conveying device 30 to convey the print medium W on which the patch chart PT has been printed by the ejection heads 20 toward the colorimetric devices 70A and 70B. Next, the controller 50 searches for the marker image. When the controller finds the marker image, the controller 50 controls the rotary actuator 91 to rotate the arm 206 in one of the colorimetric devices 70A and 70B so that the corresponding color measuring unit 208 confronts a patch or region designated by the found marker image in the patch chart PT printed on the print medium W and controls the linear actuator 81 to move the color measuring unit 208 via the prismatic joint 209 in order to position the color measuring unit 208 vertically. At this time, the controller 50 acquires the position of the patch or region designated by the prescribed marker image (the position of the patch or region that the color measuring unit 208 confronts) as marker position information corresponding to the above marker image (the specified position of the marker image). Since the area of the patch chart PT, the area of each patch column PR, and the area of each patch P are all known, the controller 50 can calculate position information on each patch column PR and position information on each patch P (each first patch Pb and second patch Ps) therein simply by acquiring this marker position information.

FIG. 5 shows a patch column table Tp that stores patch column information. The patch column table Tp in FIG. 5 is stored in the storage 53. The patch column table Tp includes information on each patch column PR specifying the presence or absence of second patches Ps and the number of patches P arranged in the patch column PR, for example. When measuring colors of patches P, the controller 50 reads the patch column table Tp from the storage 53 and determines whether each patch column PR includes second patches Ps. This process will be described later in detail.

Next, a process for measuring patches P in the patch chart PT will be described. The controller 50 performs a process to control the color measuring unit 208 of the colorimetric device 70A and the color measuring unit 208 of the colorimetric device 70B to measure the colors of at least second patches Ps among the first patches Pb and second patches Ps. In this embodiment, for each second patch Ps, the color measuring units 208 of both the colorimetric devices 70A and 70B can be used to measure the single second patch Ps. However, the color measuring unit 208 of the colorimetric device 70A and the color measuring unit 208 of the colorimetric device 70B share color measurement responsibilities for the plurality of first patches Pb. For example, one of the color measuring units 208 of the colorimetric devices 70A and 70B may measure each first patch Pb in one patch column PR while a remaining one of the color measuring unit 208 may measure each first patch Pb in another patch column PR. In this case, the measurements by the color measuring units 208 may be performed in parallel. Alternatively, only one color measuring unit 208 is used for measuring each first patch Pb.

When measuring a second patch Ps, the controller 50 first moves the base 202 of the colorimetric device 70B in the moving direction Ds and rotates the corresponding arm 206 while conveying the print medium W in the conveying direction Df as needed to control the color measuring unit 208 of the colorimetric device 70B disposed on the upstream side in the conveying direction Df to measure the color of the second patch Ps. As a result, the color measuring unit 208 of the colorimetric device 70B becomes positioned above the second patch Ps. Next, the controller 50 controls the operations of the linear actuator 81 to bring the color measuring unit 208 of the colorimetric device 70B near the print medium W. The color measuring unit 208 of the colorimetric device 70B then measures the color of the second patch Ps in this state.

Next, the controller 50 moves the base 202 of the colorimetric device 70A in the moving direction Ds and rotates the corresponding arm 206 while conveying the print medium W in the conveying direction Df as needed. In this way, the color measuring unit 208 of the colorimetric device 70A is positioned above the same second patch Ps that the color measuring unit 208 of the colorimetric device 70B has measured. Next, the controller 50 controls the operations of the linear actuator 81 to bring the color measuring unit 208 close to the print medium W. In this state, the color measuring unit 208 of the colorimetric device 70A measures the color of the same second patch Ps.

Through the above process, the color measuring units 208 of both the colorimetric devices 70A and 70B perform color measurements on a single second patch Ps. The positions inside the second patch Ps measured by the color measuring unit 208 of the colorimetric device 70A and the color measuring unit 208 of the colorimetric device 70B may be the same or different.

FIG. 6 shows a table Ta that correlates input color values of patches P with their measured color values. The controller 50 receives color measuring results from both the color measuring unit 208 of the colorimetric device 70A and the color measuring unit 208 of the colorimetric device 70B. The controller 50 receives a plurality of color measuring results and calculates the average of these results. Specifically, for each color component, the controller 50 calculates an average value by dividing the sums of measured component values of the patch P received from the color measuring units 208 in the colorimetric device 70A and colorimetric device 70B by 2. This method can suppress bias in the measured color value. The controller 50 may not use all the measured color values for one patch but may calculate an average of at least two of the measured color values for one patch to calculate the average for that patch.

For each patch P, the table Ta correlates a type indicating whether the patch P is a first patch Pb or a second patch Ps with the position, an input color value, and a measured color value of the patch P. The table Ta is stored in the storage 53. The controller 50 stores the average of measured color values calculated as described above in the table Ta as the measured color value of one second patch Ps. In this way, an average of measured color values measured for each second patch Ps is correlated with the input color value of that second patch Ps. Here, a second patch Ps is a patch P that the controller 50 generated for a color the user specified in the preview image PI described above. In other words, the table Ta correlates the input color value of each color specified in the preview image PI with the average of the measured color values measured for that color.

Figure 7:
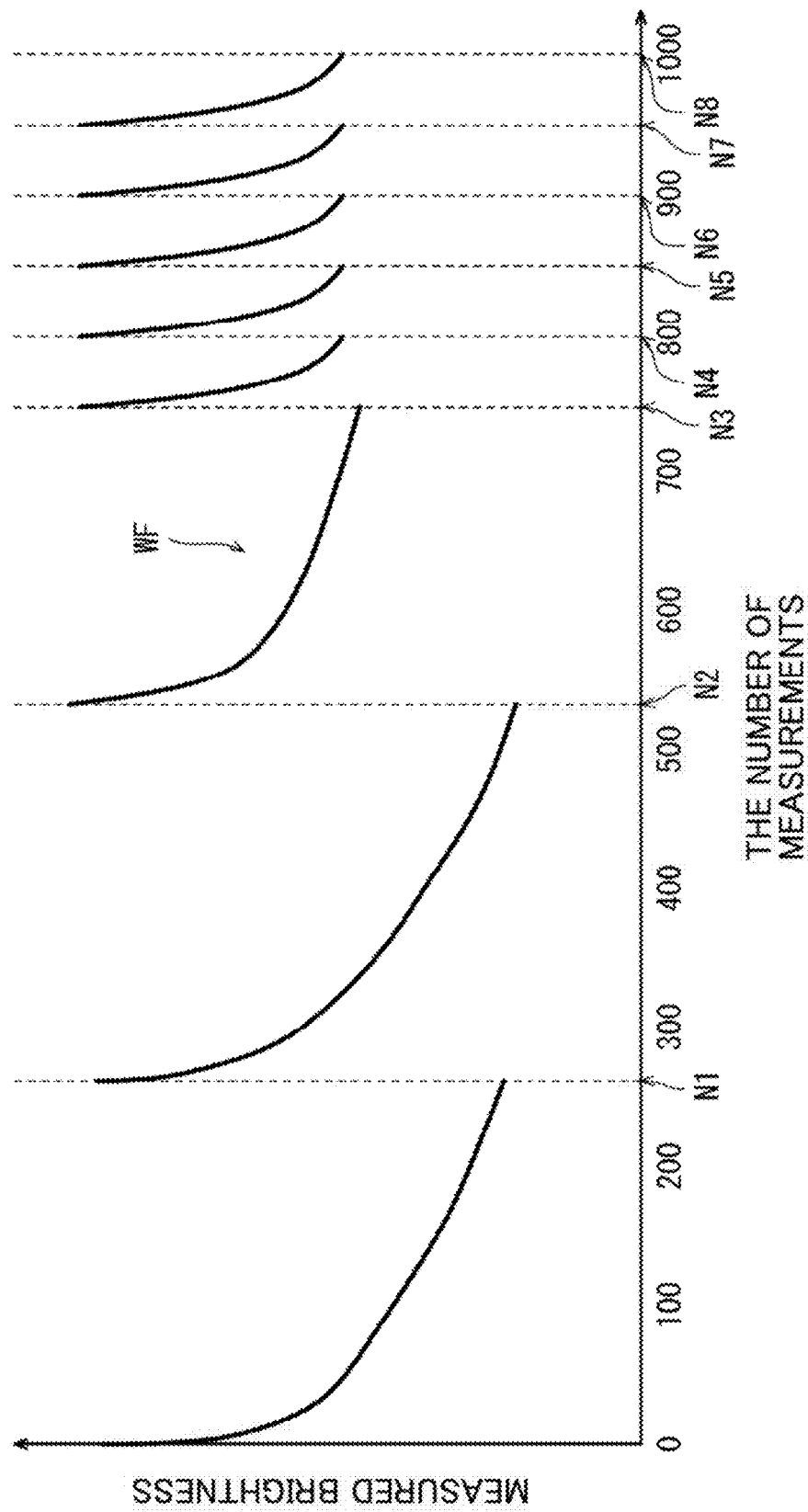
FIG. 7 is a graph showing a relationship between measurement times and measured color values to illustrate calibrations of a color measuring unit.
Figure 8:
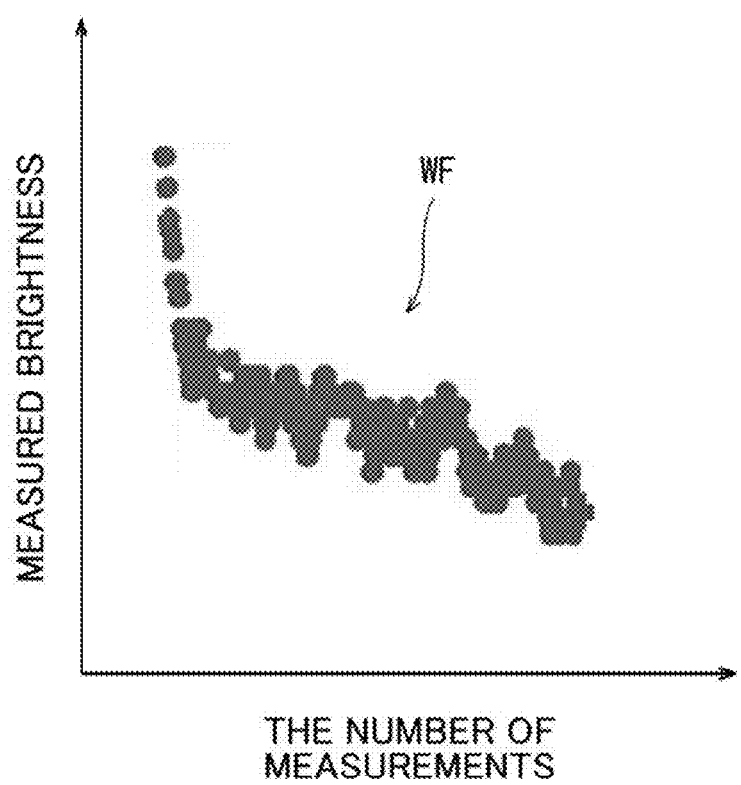
FIG. 8 is a graph showing one waveform of plotted measured color values as row data shown in FIG. 7.

FIG. 7 shows a sample relationship between measurement times and calibration processes of the color measuring unit 208. FIG. 8 is a graph in which data for one colorimetric value waveform WF in FIG. 7 has been plotted. While measured color values are expressed as data plotted in a graph as shown in FIG. 8, FIG. 7 represents this plotted data as a curve for simplification.

When each color measuring unit 208 is controlled to measure the colors of patches P continuously, the brightness of the measured color values decreases due to changes in measurement environment such as increasing of temperature, as illustrated in FIG. 7. Therefore, the controller 50 performs a calibration control process. In the calibration control process, a plurality of calibration processes is to be performed for each of the color measuring units 208. Each calibration process is to calibrate the color measuring unit 208 to adjust measurement accuracy by controlling the color measuring unit to measure a color of the white reference 210. The plurality of calibration processes is performed in a manner that a calibration process for one color measuring unit 208 is performed each time the measurement of the first patches is performed a prescribed first number of times (=N1) by that color measuring unit 208 since an immediately-previous calibration process for that color measuring unit 208 has been performed. N1 in FIG. 7 indicates the timing of a firstly-performed calibration process performed after the color measurement of first patches Pb has been measured the prescribed first number of times, and N2 indicates the timing of a secondly-performed calibration process performed after the color measurement of first patches Pb has been measured the prescribed first number of times following the firstly-performed calibration process.

On the other hand, a thirdly-performed calibration process is performed at a timing N3 that measurements for all the first patches Pb are completed. In this case, the timing N3 is set after completing the number of color measurements lower than or equal to the prescribed first number of measurements to calibrate the color measuring unit 208 prior to measuring the colors of second patches Ps (i.e., patches P that are particularly important). At the timing N3, the calibration processes may be performed for both the color measuring unit 208 in parallel. That is, after measurements of all the first patch Pb are completed and before measurements of the second patches Ps is started, a calibration process (third calibration process in this case) is always performed even if the number of measurements is lower than the prescribed first number of measurements since the immediately-previous calibration process has been performed. Alternatively, at the timing N3, one calibration process may be performed for one color measuring unit 208, and after completion of the one calibration process, another calibration process may be performed for another color measuring unit 208.

As described above, while measuring colors of the first patches Pb continuously, the calibration process for the color measuring unit 208 is performed each time the color measurement is performed by the color measuring unit 208 the prescribed first number of times. While measuring color of the second patches Ps continuously, the calibration process for the color measuring unit 208 is performed each time the color measurement is performed by the color measuring unit 208 the prescribed second number of times. Here, the prescribed second number is smaller than the prescribed first number. That is, the frequency of the calibration processes while measuring the second patches Ps is higher than that while measuring the first patches Pb. Because the patches P become second patches Ps from the 730-th patch P in the example of this embodiment, the timing N3 corresponds to the time at which color measurement has been completed for the 729-th first patch Pb.

After each calibration process is completed, the brightness of the measured color values tends to be relatively high up to a prescribed second number of measurements, as illustrated in FIG. 7, after which the brightness of the measured color values tends to be relatively low. Therefore, for each color measuring unit 208, measurements of colors of the second patches Ps are performed immediately after a calibration process is performed. In other words, the calibration process and the process for second-patch measurements are performed in this order without a color measurement of a patch other than the second patches between the calibration process and the process for second-patch measurements. Specifically, a color measurement of second patches Ps is measured by the color measuring unit 208 up to the prescribed second number of times following each calibration process for the color measuring unit 208 to improve the reliability of the measured color values. In the example of FIG. 7, for the color measuring unit 208, a color measurement of second patches Ps is performed the prescribed second number of times between the calibration process at timing N3 and the calibration process at timing N4 and the prescribed second number of times between the calibration process at timing N4 and the calibration process at timing N5. The process from timing N5 is similar. In other words, the plurality of calibration processes for the color measuring unit 208 is performed in a manner that a calibration process is performed each time the measurement of the second patches is performed by the color measuring unit 208 the prescribed second number of times (=N4−N3) since an immediately-previous calibration process for the color measuring unit 208 has been performed. In other words, for the color measuring unit 208, in a case that the plurality of calibration processes includes a first calibration process and a second calibration process, and the first calibration process and the second calibration process are performed in this order without performing any calibration process between the first calibration process and the second calibration process, the second calibration processes is performed in a case that the number of times of color measurements performed for the second patches by the one of the plurality of measuring members after completion of the first calibration process reaches a prescribed number of times.

As described above, the controller 50 separately manages the calibration process (and the calibration control process) for the color measuring unit 208 in the colorimetric device 70A and the calibration process (and the calibration control process) for the color measuring unit 208 in the colorimetric device 70B. That is, the controller 50 performs the calibration process for the color measuring unit 208 of the colorimetric device 70A in a case that the number of color measurements that have been performed by the color measuring unit 208 is greater than or equal to the prescribed first number of times while measuring colors of the first patches Pb or in a case that the number of color measurements that have been performed by the color measuring unit 208 is greater than or equal to the prescribed second number of times while measuring colors of the second patches Ps. The same is true for the color measuring unit 208 in the colorimetric device 70B. Accordingly, while calibrating one color measuring unit 208, the controller 50 can control the other color measuring unit 208 to measure the colors of second patch Ps. Alternatively, the controller 50 can calibrate both color measuring units 208 simultaneously.

As described above, the first number of times and the second number of times are fixed numbers. However, the user may change the first number and the second number.

Figure 9:
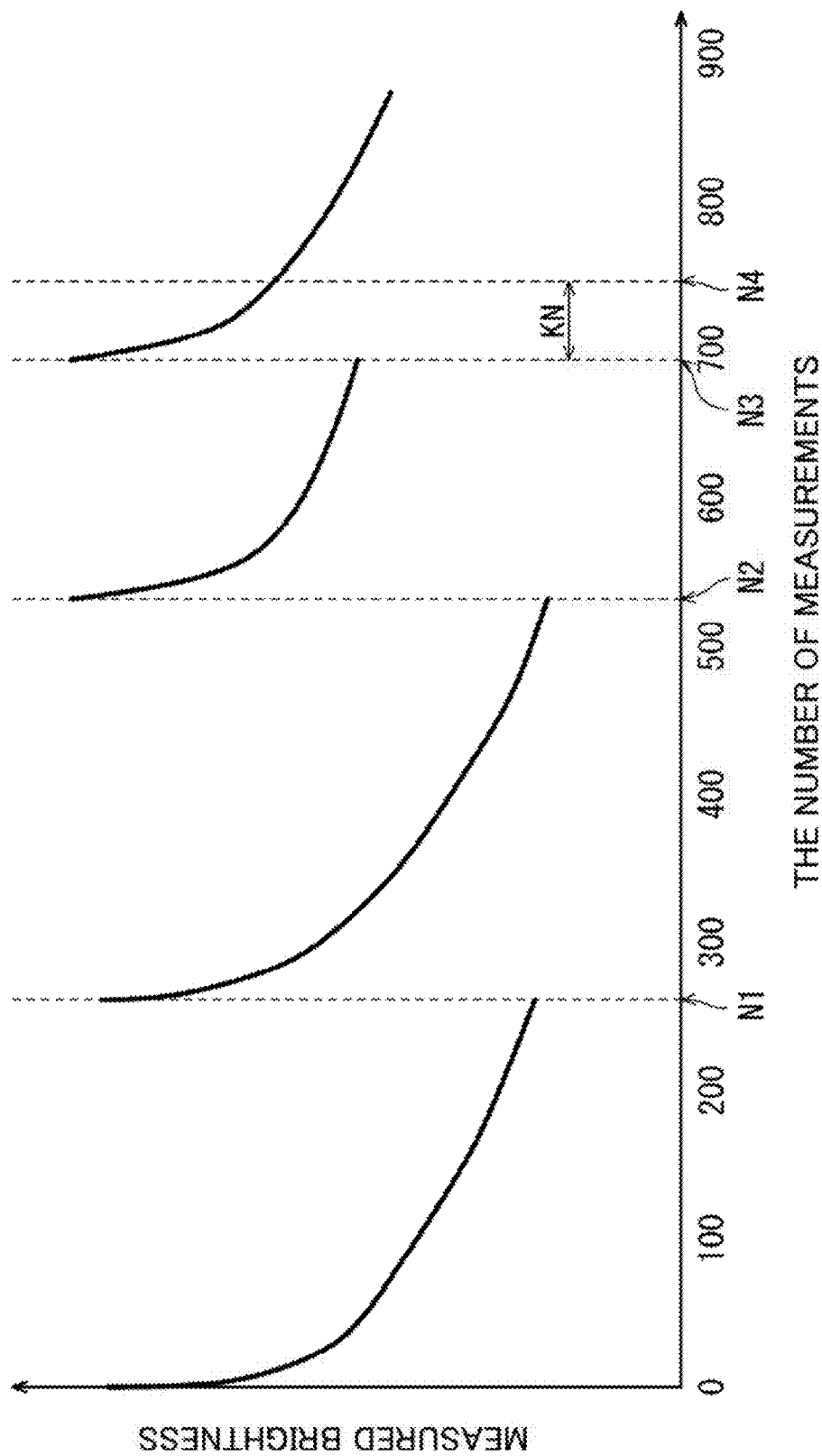
FIG. 9 is a graph showing a relationship between measurement times and measured color values to illustrate calibrations of a color measuring unit.

FIG. 9 shows another example of the relationship between measurement times and calibrations of the color measuring unit 208. As shown in FIG. 9, for the color measuring unit 208, the difference between the maximum brightness and the minimum brightness of the measured color values tends to be relatively large up to a prescribed number of measurements after each calibration process is completed. In other words, variation in measured color values is relatively large up to the prescribed number of measurements following a calibration process. Therefore, after performing the calibration process for the color measuring unit 208 at timing N3, the controller 50 may firstly perform the prescribed number of measurements (color measurements during a color measurement interval KN in FIG. 9) for first patches Pb or a dummy patch Pd (see FIG. 4) with the color measuring unit 208 and subsequently control the color measuring unit 208 to measure the colors of second patches Ps with the color measuring unit 208 at timing N4 in order that the second patches Ps are measured during measurement times in which the variation in measured color values is relatively small. In other words, a second-patch measurement process to measure a color of each second patch starts in a case that the number of times of color measurements performed for other patches after completion of the calibration process reaches a prescribed number of times. Here, the other patches are patches other than the second patches and including the dummy patch and the first patch. The same is true for each calibration process performed from this time N4. That is, each time the number of color measurements performed one color measuring unit 208 is the prescribed second number, a calibration process is performed for the color measuring unit 208. In this case, the process for second-patch measurement with that color measuring unit 208 restarts after the number of measurements of colors of the dummy patch Pd and first patches Pb performed by that color measuring unit 208 is a prescribed number subsequently to completion of the calibration process. This enables the controller 50 to suppress variations in measured color values for second patches Ps.

In the patch chart PT shown in FIG. 4, the dummy patch Pd is a patch or image of a prescribed color provided in an area that is interposed between the first patches Pb in the first patch area R1 and the second patches Ps in the second patch area R2 with respect to the conveying direction Df, for example. However, the position of the dummy patch Pd is not limited to this example. For example, the dummy patch Pd may be set downstream of the first patch area R1 in the conveying direction Df or upstream of the second patch area R2 in the conveying direction Df.

Figure 10:
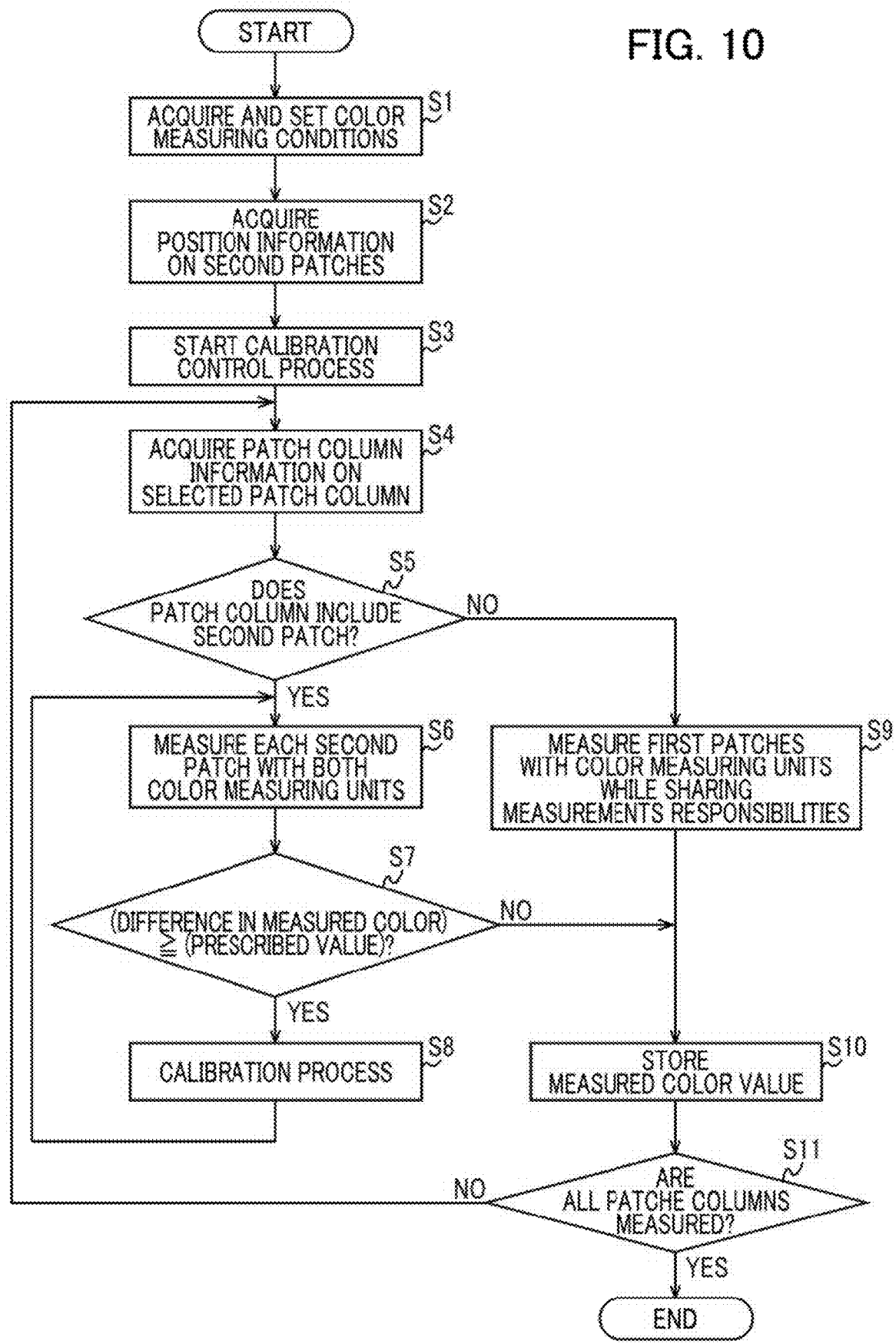
FIG. 10 is a flowchart showing a method of color measurement performed by a controller.

FIG. 10 is a flowchart showing a method of color measurement performed by the controller 50 according to the present embodiment. The controller 50 performs the process shown in the flowchart of FIG. 10 in response to a user instruction to rewrite the table Ta. Prior to performing the process in FIG. 10, the controller 50 acquires patch creation conditions from the external device 200, the input interface 15, or the like. The patch creation conditions may include the size or type of print medium W on which the patches P are to be printed and the size (dimensions) of the patches P, for example. Subsequently, the controller 50 forms the first patches Pb in the patch chart PT on the basis of the above patch creation conditions. The controller 50 also forms the second patches Ps in the patch chart PT by acquiring color information corresponding to user-specified positions in a preview image PI from preview image data representing the preview image PI or original image data from which the preview image data is generated.

As shown in FIG. 10, in S1 the controller 50 first acquires and sets color measuring conditions, including the number of patches P in the patch chart PT, the type of the light-emitting element 211 in the color measuring unit 208, and the viewing angle of the observer, i.e., the user, from the external device 200, the input interface 15, or the like.

In S2 the controller 50 acquires position information on the first patches Pb and the second patches Ps. At this time, the controller 50 acquires position information on the first patches Pb and second patches Ps from an external device, the input interface 15, or the like for each patch column PR. The position information may be based on position data acquired during printing the patch chart PT. The position information may be determined on by specifying the positions of the marker images with the colorimetric devices 70A and/or 70B as described above.

In S3 the controller 50 starts the calibration control process to perform a plurality of calibration processes for each color measuring unit 208. Here, each calibration process is to calibrate the color measuring unit 208 as shown in FIGS. 8 and 9. Specifically, from this time, the controller 50 performs the following processes for each color measuring unit 208 in parallel to the processes of S5-S11 described later. That is, for each color measuring unit 208, the controller 50 starts counting the number of measurements for the first patches Pb and the number of measurements for the second patches Ps which are performed by the color measuring unit 208 (as described later in S9). The controller 50 resets the counted numbers to zero each time the corresponding color measuring unit 208 is calibrated. Each time the number of measurements for the first patches Pb by the color measuring unit 208 is the prescribed first number of times since the immediately-previous calibration process for that color measuring unit 208, the controller 50 performs a next calibration process for the same color measuring unit 208. After all the measurements of the first patches Pb are completed and before the measurements of the second patches Ps starts, the controller 50 performs a calibration process for each color measuring unit 208. Each time the number of measurements by the color measuring unit 208 for the second patches Ps is the prescribed second number since the immediately-previous calibration process, the controller 50 performs a next calibration process for the same color measuring unit 208.

In S4 the controller 50 selects a patch column PR among patch columns in the patch chart PT whose colors of patches P have not been measured. The controller 50 may select a patch column while giving priority to each patch column including the first patches Pb (each patch column in the first patch area R1) over each patch column including one or more second patches Ps (each patch column in the second patch area R2). In this case, the patch columns in the first patch area R1 are selected continuously.

The controller 50 acquires patch column information on the selected patch column PR from the patch column table Tp described above indicating whether the patch column PR includes one or more second patches Ps. In S5 the controller 50 determines on the basis of the patch column table Tp whether the selected patch column PR includes one or more second patches Ps. When the selected patch column PR includes one or more second patches Ps (S5: YES), in S6 the controller 50 controls the color measuring units 208 of the colorimetric devices 70A and 70B so that the color measuring units 208 both measure the color of each second patch Ps in the patch column PR. The process of S6 is an example of a second-patch measurement process to control each of the plurality of measuring units 208 to measure a color of each second patch Ps to acquire a plurality of color values for the each second patch Ps.

In S7 the controller 50 determines whether the difference in measured color values measured by the color measuring unit 208 of the colorimetric device 70A and measured color values measured by the color measuring unit 208 of the colorimetric device 70B is greater than or equal to a prescribed value. The difference may be calculated on the basis of a distance between the measured color values in the L*a*b* color space. When the difference is greater than or equal to the prescribed value (S7: YES), in S8 the controller 50 perform a calibration process for each of the color measuring units 208. Alternatively, the controller 50 may perform a calibration process for only one of the color measuring units 208. After completing the process in S8, the controller 50 returns to S6 and repeats the process described above from S6.

However, when the selected patch column PR include no second patch Ps (e.g., when the patch column PR is the first column in the patch chart PT; S5: NO), in S9 the controller 50 controls the color measuring unit 208 of the colorimetric device 70A and the color measuring unit 208 of the colorimetric device 70B to share color measurement responsibilities for the plurality of first patches Pb. In other words, in S9 the controller 50 repeatedly performs measurement of a color of one first patch Pb by using one of the color measuring units 208 of the colorimetric devices 70A and 70B and measurement of a color of another first patch Pb by using remaining one of the color measuring units 208. However, color measurements of each first patch Pb in the patch column PR may be performed by both color measuring units 208 even when the patch column PR contains no second patches Ps.

After completing the process in S9 or when determining in S7 that the difference is less than the prescribed value (S7: NO), in S10 the controller 50 stores the measured color value in the table Ta in the storage 53. In S11 the controller 50 determines whether color measurements have been completed for all patch columns PR in the patch chart PT. When color measurements have been completed for all patch columns PR (S11: YES), the controller 50 ends the process in FIG. 10. However, when color measurements have not been completed for all patch columns PR (S11: NO), the controller 50 returns to S4 and repeats the process described above from S4 for unprocessed patch column.

SECOND EMBODIMENT

Figure 11:
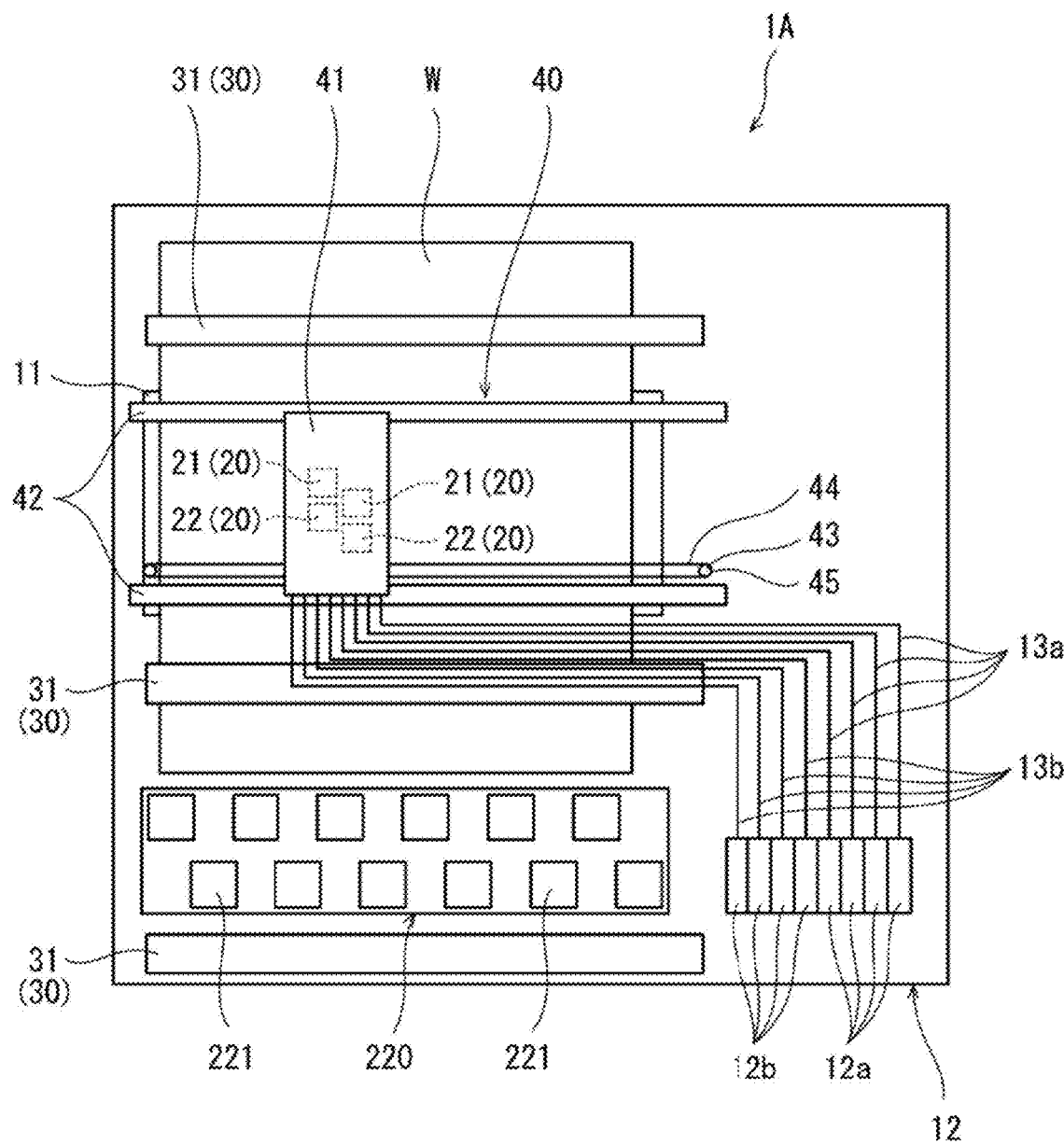
FIG. 11 is a plan view of a printing device.
Figure 11:
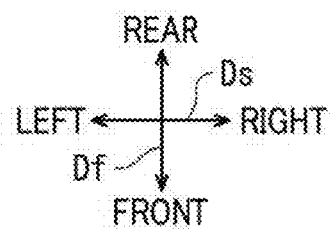

FIG. 11 is a plan view showing a printing device 1A according to a second embodiment. As shown in FIG. 11, the printing device 1A in the second embodiment differs from the printing device 1 of the first embodiment in that, in place of the pairs of guide rails 60 and the corresponding scanning devices 65 with their scanning motors 61, the endless belts 62, the pulleys 63, and the colorimetric devices 70A and 70B, the printing device 1A is provided with a colorimetric device 220 that extends in the moving direction Ds. The remaining configuration of the printing device 1A is identical to that of the printing device 1.

The colorimetric device 220 has a plurality of color measuring units 221. The color measuring units 221 include color measuring units 221 arranged on the upstream side of the colorimetric device 220 in the conveying direction Df, and color measuring units 221 arranged on the downstream side of the colorimetric device 220 in the conveying direction Df. The plurality of upstream-side measuring units 221 is arranged in a direction crossing the conveying direction (the moving direction Ds in this case), and the same is true for the downstream-side measuring units 221. The upstream-side color measuring units 221 are spaced at intervals in the moving direction Ds. Similarly, the downstream-side color measuring units 221 are spaced at intervals in the moving direction Ds. However, the upstream-side color measuring units 221 alternate positions in the moving direction Ds with the downstream-side color measuring units 221. In other words, each upstream-side color measuring units 221 is shifted from a position of any one of the downstream-side color measuring units 221 in the moving direction Ds.

The distance between the color measuring unit 221 positioned at one end (e.g., the left end) in the moving direction Ds and the color measuring unit 221 positioned at the other end (e.g., the right end) in the moving direction Ds is greater than the width of a print medium W (the dimension of the print medium W in the moving direction Ds). Further, the width in the moving direction Ds of each downstream-side color measuring unit 221 (i.e., the width of light emission) is greater than the distance between two adjacent upstream-side color measuring units 221. Similarly, the width in the moving direction Ds of each upstream-side color measuring unit 221 (i.e., the width of light emission) is greater than the distance between two adjacent downstream-side color measuring units 221. With this configuration, the color measuring units 221 can measure the colors of patches P in the patch chart PT without scanning the colorimetric device 220 in the moving direction Ds but simply by conveying the print medium W on which the patch chart PT is printed in the conveying direction Df.

Figure 12:
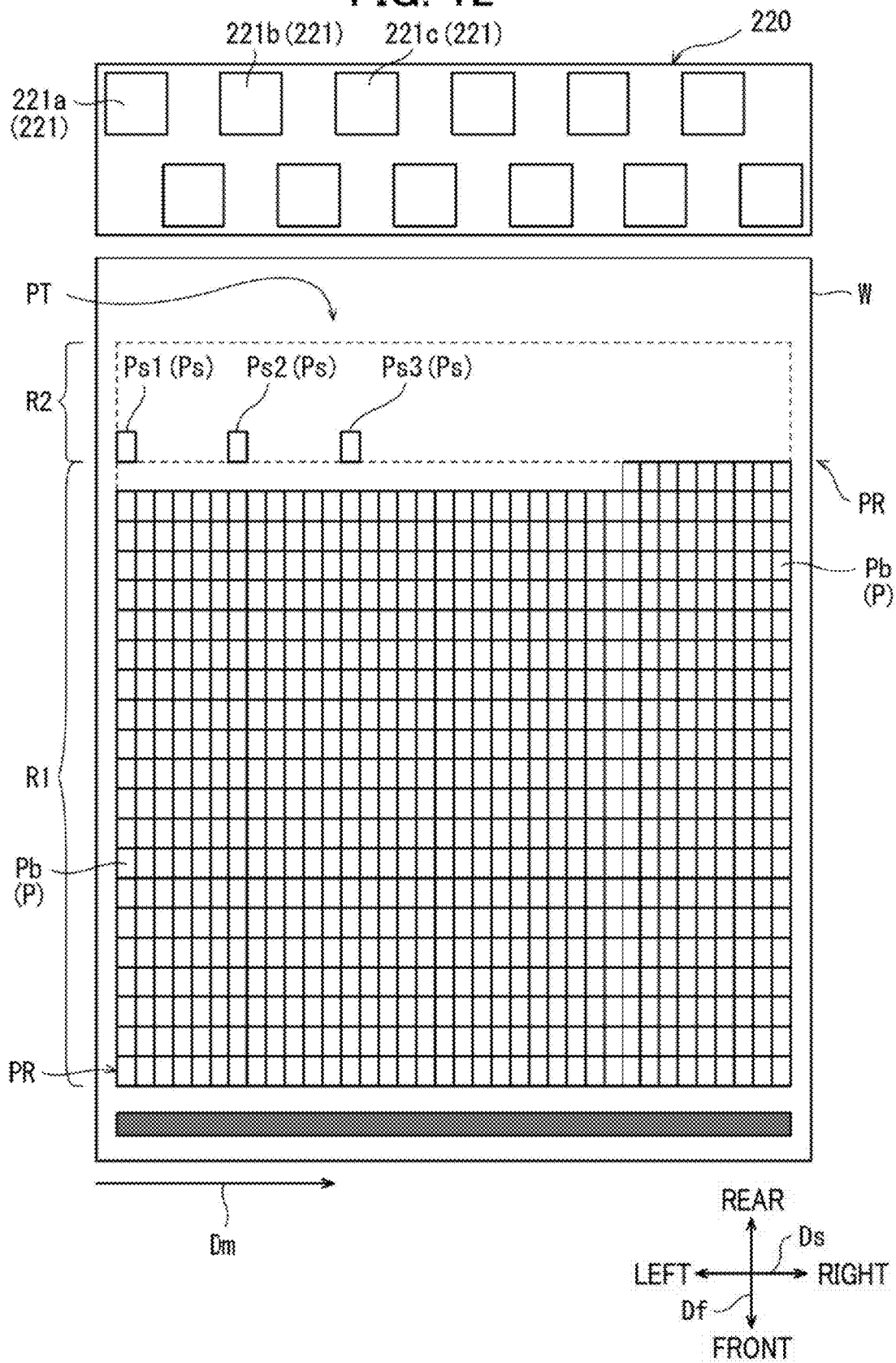
FIG. 12 is an explanatory diagram showing an example of a patch chart printed on a print medium having patches based on a same input color value.

FIG. 12 illustrates a process for measuring a plurality of second patches Ps of the same color with a plurality of color measuring units 221.

As shown in FIG. 12, the controller 50 may controls the ejection heads 20 to print a plurality of second patches Ps (Ps 1, Ps2, and Ps3) having the same color in the second patch area R2 of the patch chart PT. Here, the second patches Ps having the same color indicates the second patches Ps are printed on the basis of the same color input value. In this case, the controller 50 controls individual color measuring units 221 to measure the colors of the second patches Ps respectively corresponding to the color measuring units 221. Specifically, three second patches Ps spaced apart in the moving direction Ds (second patches Ps1, Ps2, and Ps3 in this example) have been printed in the second patch area R2 of the patch chart PT. The controller 50 controls a color measuring unit 221*a* disposed at the same position in the moving direction Ds as the second patch Ps1 to measure the color of the second patch Ps1. Similarly, the controller 50 controls a color measuring unit 221*b* disposed at the same position in the moving direction Ds as the second patch Ps2 to measure the color of the second patch Ps2. Further, the controller 50 controls a color measuring unit 221*c* disposed at the same position in the moving direction Ds as the second patch Ps3 to measure the color of the second patch Ps3. That is, the color measurement units 221*a*, 221*b*, 221*c* measure the colors of different second patches Ps that are printed on the basis of the same input color. As described above, the process for second-patch measurements is to control the plurality of measuring units 221 to measure colors of the two or more second patches based on the same input color value to acquire two or more measured color values.

Thereafter, the controller 50 calculates an average value from the color measurement results received from the plurality of color measuring units 221 for the plurality of second patches Ps having the same color. Specifically, for each color component, the controller 50 calculates an average value for the measured component color value of the second patch Ps1 measured by the color measuring unit 221*a*, the measured component value of the second patch Ps2 measured by the color measuring unit 221*b*, and the measured component value of the second patch Ps3 measured by the color measuring unit 221*c*. The controller 50 then stores the calculated averages of the measured component values in the table Ta of FIG. 6 as the measured color value for the same input color value of the second patches Ps1, Ps2, and Ps3. In this case, the table Ta may correlate the input color value of the second patches Ps1, Ps2, and Ps3 with the position of all the second patches Ps1, Ps2, and Ps3, or with the position of a representative one of the second patches Ps1, Ps2, and Ps3. In this way, the average value calculated above is correlated with the same input color value of the second patches Ps1, Ps2, and Ps3. By controlling color measuring units 221 to measure the colors of corresponding second patches Ps as described above, the controller 50 of the printing device 1A corresponds to the control device that performs a process for controlling a plurality of color measuring units to measure the colors of at least second patches among the first patches and second patches.

The above average value may also be calculated by excluding the minimum and maximum values from the color measurement results produced by a plurality of color measuring units 221 (four or more color measuring units 221, for example). For example, when four patches Ps have been printed on the basis of the same input color value, four color measuring units 221 measure the colors of respective second patches Ps. Next, the minimum and maximum values in the measured color values obtained from the four color measuring units 221 are excluded and average value is calculated from the remaining two sets of measured color values. The maximum value and minimum value may be determined on the basis of a distance of each measured color value from the origin in the L*a*b* space. For example, the measured color value having a longest distance from the origin (0, 0, 0) is determined as the maximum value among the measured color values of the second patch Ps. Similarly, the measured color value having a shortest distance from the origin is determined as the minimum value among the measured color values of the second patch Ps.

With the printing device 1 according to the first embodiment described above, the color measuring units 208 in the colorimetric devices 70A and 70B both perform color measurements of each second patch Ps among the first patches Pb and second patches Ps. In this way, a plurality of measured color values can be obtained for a single second patch Ps. Utilizing the average measured color value as the measured color value for the second patch Ps can suppress bias in measured color value for second patch Ps, whose colors the user wishes to calibrate, thereby improving color measurement accuracy.

In the first embodiment, a color measurement of second patches Ps are performed up to a prescribed number of times after the color measuring unit 208 has been calibrated. This allows second patches Ps to be measured at a time when the brightness of the measured color values is relatively high, thereby improving the reliability of measured color values for the second patch Ps.

In the above embodiments, when the color measuring units 208 of the colorimetric devices 70A and 70B have just been calibrated, the controller 50 can control the color measuring units 208 to measure the colors of second patches Ps after a color measurement of the first patches Pb or dummy patch Pd a prescribed number of times. This method can suppress variation in the measured color values for the second patches Ps.

In the second embodiment described above, the controller 50 controls a plurality of color measuring units 221 to measure the colors of a plurality of second patches Ps having the same color. Subsequently, the controller 50 calculates average value from the color measurement results by the plurality of color measuring units 221 for second patches Ps having the same color. Next, the controller 50 stores the average measured color value calculated above in the table Ta as the measured color value for the second patches Ps having the same color. This method can suppress bias in the measured color values for individual second patches Ps.

In the second embodiment described above, the controller 50 may exclude the minimum and maximum values from the color measurement results received from a plurality of color measuring units 221 (e.g., four or more color measuring units 221) when calculating the average value. This can further suppress bias in the measured color values for individual second patches Ps.

In the first embodiment, the controller 50 may calibrate one of the color measuring units 208 when the number of measurements performed by the color measuring unit 208 is greater than or equal to a prescribed number. This method can suppress a drop in color measuring accuracy.

In the above embodiments, the white reference 210 is provided for both the color measuring unit 208 of the colorimetric device 70A and the color measuring unit 208 of the colorimetric device 70B. This can simplify the arrangement by not requiring a separate white reference 210 for each of the colorimetric devices 70A and 70B.

(Variations)

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the first embodiment described above, the controller 50 may control a plurality of color measuring units 208 to measure the color of each second patch Ps while controlling the ejection heads 20 to print the patch chart PT on the print medium W. In other words, during the printing process, the process for second-patch measurements starts so that each of the plurality of measuring units 208 measures colors of printed one or more of the plurality of second patches. This method may be applied in such cases as when the second patch area R2 in the patch chart PT of FIG. 4 having the second patches Ps arranged therein is longer in the conveying direction Df than the distance between the ejection heads 20 and the movable range of the arm 206 in the colorimetric device 70B, or when the first patch area R1 in the patch chart PT being measured is arranged on the upstream side of the second patch area R2 in the conveying direction Df, unlike the arrangement of FIG. 4. This can shorten the overall time for printing and measuring colors to achieve a more efficient process.

The plurality of color measuring units 208 employed in the first embodiment includes the two color measuring units 208 in the colorimetric device 70A and the colorimetric device 70B, but three or more color measuring units 208 may be provided instead. In this case, three or more color measuring units 208 measures color of each second patch Ps. In a case that four or more color measurement units 208 is provided and measures color of each second patch Ps to acquire four or more measured color values, the controller 60 may exclude the maximum color value and the minimum color value from the four or more measured color values to calculate the average. The maximum color value and the minimum color value are determined in a manner similar to the second embodiment.

In the first embodiment described above, the base 202 of the colorimetric device 70A is supported on one pair of guide rails 60, and the base 202 of the colorimetric device 70B is supported on the other pair. However, the printing device 1 may be configured of a single pair of guide rails 60 on which the bases 202 of both the colorimetric devices 70A and 70B are supported. In this case, the base 202 of the colorimetric device 70A and the base 202 of the colorimetric device 70B may be arranged adjacent to each other in the moving direction Ds.

While the white reference 210 in the first embodiment described above is shared among the color measuring units 208, a white reference 210 may be provided for each color measuring unit 208 instead. In this case, each white reference 210 may be provided on the corresponding base 202.

In the above embodiments, the preview image PI is displayed on the display 14 of the printing device 1 or 1A, but the preview image PI may be displayed on the display of a personal computer or the like capable of communicating with the printing device 1 or 1A via a cable or wirelessly.

In the above embodiments, the controller 50 calculates the average value for the color measurement results measured by the color measuring unit 208 of the colorimetric device and the color measuring unit 208 of the colorimetric device 70B. However, the controller may control the color measuring unit 208 of the colorimetric device 70A to measure each color a plurality of times and may control the color measuring unit 208 of the colorimetric device 70B to measure each color a plurality of times. In this case, the controller 50 may calculate an average value from the plurality of color measurement results obtained from the color measuring unit 208 of the colorimetric device 70A and from the plurality of color measurement results obtained from the color measuring unit 208 of the colorimetric device 70B.

While an inkjet printer is offered as an example of the printing devices 1 and 1A in the embodiments described above, each of the printing devices 1 and 1A may be another printer, such as a laser printer or a thermal printer. A laser printer is provided with a print engine (printing unit). The print engine of a direct tandem laser printer includes an image carrier such as a photosensitive drum or a photosensitive belt, a charging member that charges the image carrier through contact or non-contact, an exposure member that forms an electrostatic latent image on the charged image carrier using a laser semiconductor or the like (known as "exposure"), a toner cartridge or developing cartridge that supplies toner to the image carrier on which an electrostatic latent image has been formed, a transfer member such as a transfer roller or belt that transfers the developed toner image from the image carrier directly to a print medium, and a fixing member such as a fixing roller or belt that thermally fixes the toner transferred onto the print medium. The laser printer is not limited to a direct tandem laser printer but may be an intermediate transfer laser printer. The intermediate transfer laser printer first transfers the developed toner image from the image carrier onto an intermediate transfer belt before using the transfer member to transfer the toner image from the intermediate transfer belt onto the print medium. A thermal printer is also provided with a print engine (printing unit). The print engine of a thermal printer includes a thermal head, and an ink ribbon. The thermal head contacts the ink ribbon and transfers ink in the ink ribbon onto a print medium by generating heat in selected heating elements.

Further, while the printing devices 1 and 1A are serial printers in the embodiments described above, the printing devices 1 and 1A may be line printers, for example.

While each of the colorimetric devices 70 and 70A is provided with the arm 206, the colorimetric device may simply be provided with the prismatic joint 209 on the base 202, without the arm 206. In this case, the color measuring unit 208 is moved in the moving direction Ds by the base 202 only and is moved vertically by the linear actuator 81 of the prismatic joint 209.

In the first embodiment described above, the controller 50 calculates the average value by dividing the sums of color measurement results from the color measuring unit 208 of the colorimetric device 70A and color measurement results from the color measuring unit 208 of the colorimetric device 70B by 2, but the present invention is not limited to this method. For example, when the precision of the color measurements is higher for the colorimetric device 70A than that for the colorimetric device 70B for any reason, the controller 50 may calculate an weighted average by giving the color measurement results (the measured color value) from the color measuring unit 208 of the colorimetric device 70A more weight than the color measurement results (the measured color value) from the color measuring unit 208 of the colorimetric device 70B and dividing their sums by 2.

In the second embodiment described above, three second patches Ps (the second patches Ps1, Ps2, and Ps3) are printed in the second patch area R2 of the patch chart PT at intervals in the moving direction Ds, and the controller 50 calculates the average value from the measured color value for the second patch Ps1 measured by the color measuring unit 221a, the measured color value for the second patch Ps2 measured by the color measuring unit 221b, and the measured color value for the second patch Ps3 measured by the color measuring unit 221c, but the present invention is not limited to this method. For example, when the precision of color measurements is higher for the color measuring unit 221b than that for the color measuring unit 221a and higher for the color measuring unit 221c than that for the color measuring unit 221b for any reason, the controller 50 may calculate weighted average by giving measured color value for the second patch Ps2 measured by the color measuring unit 221b more weight than measured color value for the second patch Ps1 measured by the color measuring unit 221a, giving measured color value for the second patch Ps3 measured by the color measuring unit 221c more weight than measured color value for the second patch Ps2 measured by the color measuring unit 221b, and dividing their sums by 3.

In the above embodiments, the controller 50 performs the process according to the flowchart of FIG. 10 in response to the user instruction to rewrite the table Ta. However, the controller 50 may perform the process in FIG. 10 each time a print job is received. That is, the process in FIG. 10 may be performed without the user instruction. In a case that the controller 50 performs the process in FIG. 10 upon reception of a print job, the controller 50 begins printing on a print medium W based on the print job after color measurements are completed for all patch columns PR (S11: YES) and color calibration for printing is performed on the basis of the results of color measurements. Once printing on the print medium W is completed, the controller 50 may end the process of FIG. 10.

What is claimed is:

1. A printing device comprising:
a print head configured to print a patch chart on a print medium, the patch chart including a plurality of patches including a plurality of first patches and one or more second patches, each of the plurality of first patches having a predetermined color, each of the one or more second patches having a user specified color represented by an input color value;
a plurality of color value measuring devices each configured to measure a color of a patch; and
a controller,
wherein the controller is configured to perform:
a second-patch measurement process to control each of the plurality of color value measuring devices to measure a color of each of the one or more second patches to acquire a plurality of color values for each of the one or more second patches;
wherein the patch chart further includes a dummy patch,
wherein the controller is configured to further perform:
a calibration process to calibrate one of the plurality of color value measuring devices by controlling the one of the plurality of color value measuring devices to measure a color of a reference,
wherein the second-patch measurement process starts in a case that the number of times of color measurements, each of which is performed for any one of other patches, after completion of the calibration process reaches a prescribed number of times, the other patches being patches other than the one or more second patches and including the dummy patch and one of the plurality of first patches.

2. The printing device according to claim 1, wherein the controller is configured to further perform:
calculating an average value of the plurality of color values for each of the one or more second-patches; and
generating a table correlating the input color value with the average value as a measured color value for each of the one or more second patches.

3. The printing device according to claim 1, wherein the controller is configured to further perform:
a second calibration process to calibrate one of the plurality of color value measuring devices by controlling the one of the plurality of color value measuring devices to measure the color of the reference,
wherein the second calibration process and the second-patch measurement process are performed in this order without a color measurement of any one of second other patches between the second calibration process and the second-patch measurement process, the second other patches being patches other than the one or more second patches.

4. The printing device according to claim 1, wherein the controller is configured to further perform:
a printing process to control the print head to print the patch chart,
wherein during the printing process, the second-patch measurement process starts so that each of the plurality of color value measuring devices measures colors of printed one or more of the one or more second patches.

5. A printing device comprising:
a print head configured to print a patch chart on a print medium, the patch chart including a plurality of patches including a plurality of first patches and one or more second patches, each of the plurality of first patches having a predetermined color, each of the one or more second patches having a user specified color represented by an input color value;
a plurality of color value measuring devices each configured to measure a color of a patch; and
a controller,
wherein the controller is configured to perform:
a second-patch measurement process to control each of the plurality of color value measuring devices to measure a color of each of the one or more second patches to acquire a plurality of color values for each of the one or more second patches, and
wherein the controller is configured to further perform:
a plurality of calibration processes for one of the plurality of color value measuring devices, each of the plurality of calibration processes for the one of the plurality of color value measuring devices being to calibrate the one of the plurality of color value measuring devices by controlling the one of the plurality of color value measuring devices to measure a color of a reference,
wherein the plurality of calibration processes for the one of the plurality of color value measuring devices includes a first calibration process and a second calibration process performed in this order without performing any calibration process for the one of the plurality of color value measuring devices between the first calibration process and the second calibration process,
wherein the second calibration process is performed in a case that the number of times of color measurements, each of which is performed for any one of the one or more second patches by the one of the plurality of color value measuring devices, after completion of the first calibration process reaches a prescribed number of times.

6. A printing device comprising:
a print head configured to print a patch chart on a print medium, the patch chart including a plurality of patches including a plurality of first patches and a plurality of second patches, each of the plurality of first patches having a predetermined color, each of the plurality of second patches having a user specified color represented by an input color value;
a plurality of color value measuring devices each configured to measure a color of a patch; and
a controller,
wherein the plurality of second patches includes two or more second patches represented by a same input color value,
wherein the controller is configured to perform:
a printing process to control the print head to print the patch chart;
a second-patch measurement process to control the plurality of color value measuring devices to measure colors of the two or more second patches based on the same input color value to acquire two or more color values; and
calculating an average value of at least two of the two or more color values, as a measured color value corresponding to the same input color value;
wherein the patch chart further includes a dummy patch,
wherein the controller is configured to further perform:
a calibration process to calibrate one of the plurality of color value measuring devices by controlling the one of the plurality of color value measuring devices to measure a color of a reference, wherein the second-patch measurement process starts in a case that the number of times of color measurements, each of which is performed for any one of other patches, after completion of the calibration process reaches a prescribed number of times, the other patches being patches other than the plurality of second patches and including the dummy patch and one of the plurality of first patches.

7. The printing device according to claim 6, further comprising:
a conveying member configured to convey the print medium in a conveying direction,
wherein the plurality of color value measuring devices is arranged in a direction crossing the conveying direction.

8. The printing device according to claim 6, wherein the number of the two or more color values is greater than or equal to four,
wherein the two or more color values include a maximum value and a minimum value,
wherein the average value is an average of the two or more color values excluding the maximum value and the minimum value.

9. A method for measuring colors of a patch chart on a print medium, the patch chart including a plurality of patches including a plurality of first patches and one or more second patches, each of the plurality of first patches having a predetermined color, each of the one or more second patches having a user specified color represented by an input color value, the method comprising:
performing a second-patch measurement process of controlling each of a plurality of color value measuring devices to measure a color of each of the one or more second patches to acquire a plurality of color values for each of the one or more second patches;
wherein the patch chart further includes a dummy patch, wherein the method further comprises:
performing a calibration process of calibrating one of the plurality of color value measuring devices by controlling the one of the plurality of color value measuring devices to measure a color of a reference,
wherein the second-patch measurement process starts in a case that the number of times of color measurements, each of which is performed for any one of other patches, after completion of the calibration process reaches a prescribed number of times, the other patches being patches other than the one or more second patches and including the dummy patch and one of the plurality of first patches.

10. A method for measuring colors of a patch chart, the method comprising:
controlling a print head to print the patch chart on a print medium, the patch chart including a plurality of patches including a plurality of first patches and a plurality of second patches, each of the plurality of first patches having a predetermined color, each of the plurality of second patches having a user specified color represented by an input color value, the plurality of second patches including two or more second patches represented by a same input color value;
performing a second-patch measurement process of controlling a plurality of color value measuring devices to measure colors of the two or more second patches based on the same input color value to acquire two or more color values; and
calculating an average value of at least two of the two or more color values, as a measured color value corresponding to the same input color value;
wherein the patch chart further includes a dummy patch, wherein the method further comprises:
performing a calibration process of calibrating one of the plurality of color value measuring devices by controlling the one of the plurality of color value measuring devices to measure a color of a reference,
wherein the second-patch measurement process starts in a case that the number of times of color measurements, each of which is performed for any one of other patches, after completion of the calibration process reaches a prescribed number of times, the other patches being patches other than the plurality of second patches and including the dummy patch and one of the plurality of first patches.

11. A printing device comprising:
a print head configured to print a patch chart on a print medium, the patch chart including a plurality of patches including a plurality of first patches and a plurality of second patches, each of the plurality of first patches having a predetermined color, each of the plurality of second patches having a user specified color represented by an input color value;
a plurality of color value measuring devices each configured to measure a color of a patch; and
a controller,
wherein the plurality of second patches includes two or more second patches represented by a same input color value,
wherein the controller is configured to perform:
a printing process to control the print head to print the patch chart;
a second-patch measurement process to control the plurality of color value measuring devices to measure colors of the two or more second patches based on the same input color value to acquire two or more color values; and
calculating an average value of at least two of the two or more color values, as a measured color value corresponding to the same input color value;
wherein the controller is configured to further perform:
a plurality of calibration processes for one of the plurality of color value measuring devices, each of the plurality of calibration processes for the one of the plurality of color value measuring devices being to calibrate the one of the plurality of color value measuring devices by controlling the one of the plurality of color value measuring devices to measure a color of a reference,
wherein the plurality of calibration processes for the one of the plurality of color value measuring devices includes a first calibration process and a second calibration process performed in this order without performing any calibration process for the one of the plurality of color value measuring devices between the first calibration process and the second calibration process,
wherein the second calibration process is performed in a case that the number of times of color measurements, each of which is performed for any one of the plurality of second patches by the one of the plurality of color value measuring devices, after completion of the first calibration process reaches a prescribed number of times.

12. A method for measuring colors of a patch chart on a print medium, the patch chart including a plurality of patches including a plurality of first patches and one or more second patches, each of the plurality of first patches having a predetermined color, each of the one or more second patches having a user specified color represented by an input color value, the method comprising:

controlling each of a plurality of color value measuring devices to measure a color of each of the one or more second patches to acquire a plurality of color values for each of the one or more second patches; and performing a plurality of calibration processes for one of the plurality of color value measuring devices, each of the plurality of calibration processes for the one of the plurality of color value measuring devices being to calibrate the one of the plurality of color value measuring devices by controlling the one of the plurality of color value measuring devices to measure a color of a reference, wherein the plurality of calibration processes for the one of the plurality of color value measuring devices includes a first calibration process and a second calibration process performed in this order without performing any calibration process for the one of the plurality of color value measuring devices between the first calibration process and the second calibration process, wherein the second calibration process is performed in a case that the number of times of color measurements, each of which is performed for any one of the one or more second patches by the one of the plurality of color value measuring devices, after completion of the first calibration process reaches a prescribed number of times.

13. A method for measuring colors of a patch chart, the method comprising:

controlling a print head to print the patch chart on a print medium, the patch chart including a plurality of patches including a plurality of first patches and a plurality of second patches, each of the plurality of first patches having a predetermined color, each of the plurality of second patches having a user specified color represented by an input color value, the plurality of second patches including two or more second patches represented by a same input color value;

controlling a plurality of color value measuring devices to measure colors of the two or more second patches based on the same input color value to acquire two or more color values;

calculating an average value of at least two of the two or more color values, as a measured color value corresponding to the same input color value; and performing a plurality of calibration processes for one of the plurality of color value measuring devices, each of the plurality of calibration processes for the one of the plurality of color value measuring devices being to calibrate the one of the plurality of color value measuring devices by controlling the one of the plurality of color value measuring devices to measure a color of a reference, wherein the plurality of calibration processes for the one of the plurality of color value measuring devices includes a first calibration process and a second calibration process performed in this order without performing any calibration process for the one of the plurality of color value measuring devices between the first calibration process and the second calibration process, wherein the second calibration process is performed in a case that the number of times of color measurements, each of which is performed for any one of the plurality of second patches by the one of the plurality of color value measuring devices, after completion of the first calibration process reaches a prescribed number of times.

* * * * *